Aug. 18, 1925.

C. P. WIGGINS

SPRING SUPPORTER

Filed Feb. 12, 1924

1,550,478

Inventor
C. P. Wiggins.

By Townshend & Townshend
Attorney

Patented Aug. 18, 1925.

1,550,478

UNITED STATES PATENT OFFICE.

CLARENCE P. WIGGINS, OF WIGGINS, MISSISSIPPI.

SPRING SUPPORTER.

Application filed February 12, 1924. Serial No. 692,254.

*To all whom it may concern:*

Be it known that I, CLARENCE P. WIGGINS, a citizen of the United States, residing at Wiggins, R. F. D. A., in the county of Stone and State of Mississippi, have invented certain new and useful Improvements in Spring Supporters, of which the following is a specification.

My invention relates to chassis equipment for automobiles, and has particular reference to a device adapted to increase the life of springs employed and to prevent undue vibration and rocking of the vehicle.

The objects of the invention are: to provide a novel and improved support for a vehicle spring; to provide such a support adapted to be positioned over the front spring of an automobile; to provide a support of this character constructed and arranged to eliminate lateral rocking of the vehicle body on the spring; to provide a support of this character which may be readily and quickly applied without altering any of the details of the standard construction in use at the present time.

With these general objects in view, and others that will be apparent from the description, my invention resides in the novel combination, construction and arrangements of parts hereinafter described and claimed and illustrated in the accompanying drawings, of which—

Figure 1:
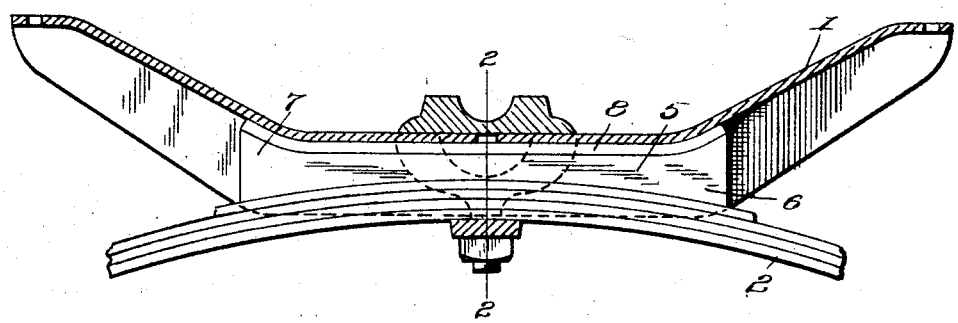
Figure 2:
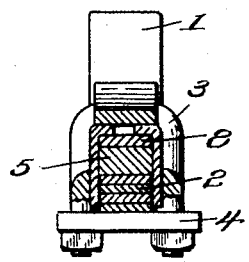
Figure 3:
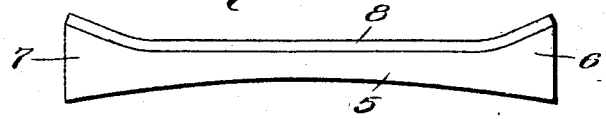

Figure 1 is a front elevation of an automobile chassis and body of the Ford type equipped with the invention;

Figure 2, a vertical section on the line 2—2 of Figure 1;

Figure 3, a side elevation of the supporting member; and

Figure 4:
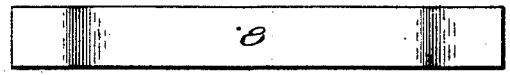

Figure 4, a top plan view thereof.

As illustrated, 1 designates the front cross bar of a Ford automobile, and 2 the elliptical front leaf spring employed, which, of the usual construction, is secured to the front cross bar by the ordinary U-bolt 3, and clamping plate 4.

The invention comprises a block 5 preferably of wood, but which may be formed of any suitable material, having its under surface concave to accommodate the curvature of the upper leaf of an elliptical front spring 2, on which it is adapted to rest. The upper face of the block 5 conforms in general outline to the contour of the under portion of the cross bar 1, which provides substantially flared end portions 6 and 7 on the block. The upper face of the supporting block is covered with a substantially thick rubber or other suitable cushioning strip 8, firmly secured to the block.

The supporting block 5 is adapted to be positioned underneath the front cross bar of a machine and between the central portion of the cross bar and the upper leaf of the elliptical front spring. It is securely clamped in position by means of the ordinary U-bolt and clamping plate employed to hold the spring in place. As the block 5 is of the substantial length, a relatively far greater bearing surface for the front bar of the vehicle is provided as the end face of the block engages the upper leaf of the elliptical spring throughout the entire length of the block. This construction eliminates lateral rocking of the vehicle body relative to the spring, thereby materially lessening the danger of the spring breaking at its central point. The cushioning member 8 on the upper face of the supporting block eliminates undue vibration and road shock and increases the life and effect of the block when in position.

By reason of the configuration of the supporting block, its ends 6 and 7 are flared and extend at each end a slight distance upwardly under the angle portion of the front cross bar of the machine, to which the same is applied, thereby effectually preventing any possibility of rocking movement between the cross bar and the spring. The device may be readily and quickly applied to any machine using the construction as illustrated, as it is a simple matter to remove the clamping plate 4 from the spring securing U-bolt and raise the vehicle body sufficiently to allow the supporting block to be inserted in the desired position, one or more of the upper spring leaves being removed.

While in its preferred form, I have illustrated and described certain materials and details entering into the construction and operation of the device, I desire it to be understood that I do not intend to limit the invention to such as are specifically illustrated and described, but that changes may be made in the details thereof as will fall within the scope of the invention as claimed.

I claim:

The combination with a vehicle having a front cross bar including a horizontally extending center portion and upwardly turned end portions, and a front spring, of a rigid supporting block interposed between said bar and spring, said block being slightly longer than the horizontal portion of the cross bar, enlarged stop portions on the ends of said block past the horizontal portion of the cross bar whereby the upper edge of the block engages the cross bar for the full length of said block, and the lower edge of said block being curved to conform to the contour of the spring for continuous engagement therewith for its entire length whereby the enlarged stop portions on the block have a continuous positive engagement with the bar and spring to prevent excessive rocking of the body of the vehicle.

In testimony whereof I affix my signature.

CLARENCE P. WIGGINS.